(12) United States Patent
Tagawa et al.

(10) Patent No.: US 6,614,620 B2
(45) Date of Patent: Sep. 2, 2003

(54) THIN FILM MAGNETIC HEAD

(75) Inventors: Ikuya Tagawa, Kawasaki (JP); Tomoko Kutsuzawa, Kawasaki (JP); Hideo Niwa, Kawasaki (JP); Yukinori Ikegawa, Kawasaki (JP); Yoshinori Ohtsuka, Kawasaki (JP); Hiroshi Maeda, Kawasaki (JP); Takashi Sekikawa, Kawasaki (JP); Hiroki Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 09/778,007

(22) Filed: Feb. 6, 2001

(65) Prior Publication Data
US 2002/0048116 A1 Apr. 25, 2002

(30) Foreign Application Priority Data
Oct. 19, 2000 (JP) .................................. 2000-318856

(51) Int. Cl.⁷ .............................................. G11B 5/147
(52) U.S. Cl. ...................................................... 360/126
(58) Field of Search ................................ 360/126, 125, 360/121, 119, 122, 317

(56) References Cited

U.S. PATENT DOCUMENTS

| 5,801,910 A | * | 9/1998 | Mallary ....................... 360/126 |
| 6,118,627 A | * | 9/2000 | Stageberg et al. ........... 360/126 |
| 6,198,597 B1 | * | 3/2001 | Tateyama et al. ........... 360/126 |
| 6,330,127 B1 | * | 12/2001 | Sasaki ......................... 360/126 |
| 6,381,093 B2 | * | 4/2002 | Yoshida et al. ............. 360/126 |

FOREIGN PATENT DOCUMENTS

| JP | 10-308003 | 11/1998 |
| JP | 11-007609 | 1/1999 |
| JP | 11-149621 | 6/1999 |
| JP | 11-175932 | 7/1999 |
| JP | 2000-099918 | 4/2000 |
| JP | 2000-099919 | 4/2000 |
| JP | 2000-099920 | 4/2000 |

* cited by examiner

Primary Examiner—Allen Cao
(74) Attorney, Agent, or Firm—Greer, Burns & Crain, Ltd.

(57) ABSTRACT

A thin film magnetic head includes an upper magnetic pole maintaining a constant thickness in a range determined by the so-called gap depth. A thinner film portion is defined in the upper magnetic pole in a range rearward of the range determined by the gap depth. The thinner film portion has a reduced thickness smaller than the constant thickness. The upper magnetic pole starts to enlarge the core width in the lateral direction at the rear end of the region determined by the so-called neck height. The neck height smaller than the gap depth serves to establish a reduction in the thickness of the upper magnetic pole after the upper magnetic pole gets larger in the lateral direction. A magnetic saturation can reliably be prevented at the thinner film portion in the upper magnetic pole. The front end of the upper magnetic pole is allowed to receive a larger quantity of a magnetic flux. It is possible to reliably enhance a magnetic field for recordation in the thin film magnetic head.

13 Claims, 8 Drawing Sheets

THIN FILM MAGNETIC HEAD

BACKGROUND OF THE INVENTION

1. Field of the Invention

The present invention relates to a thin film magnetic head in general employed in a magnetic recording medium drive or storage device such as a magnetic disk drive and a magnetic tape drive, for example.

2. Description of the Prior Art

A non-magnetic gap layer is interposed between an upper and a lower magnetic pole layer in a thin film magnetic head. The non-magnetic gap layer is designed to extend to the central position of a swirly conductive coil pattern from the front end exposed at a medium-opposed surface or bottom surface of a head slider. As conventionally known, the non-magnetic gap layer maintains its thickness constant in a range in general referred to as a gap depth. Reduction in the gap depth is supposed to lead to enhancement of a magnetic field leaked out of the medium-opposed surface, namely, a magnetic field for recordation. As disclosed in Japanese Patent Application Laid-open No. 11-149621, for example, an insulation layer can be utilized to define the rear end of a region determined by the gap depth. The insulation layer in this case is designed to swell from the surface of the lower magnetic pole layer at a position retracted from the medium-opposed surface.

A thin film magnetic head is well known to include a tip pole piece connected to an upper magnetic pole layer. In general, the tip pole piece is subjected to a flattening polishing treatment prior to formation of the thin film swirly coil pattern. When the tip pole piece is flattened in this manner, a thinner film portion is generated in the tip pole piece right on the aforementioned insulation layer swelling from the surface of the lower magnetic pole layer. A magnetic flux is introduced to the front end of the tip pole piece after having passed through the thinner film portion. The magnetic flux thus reaching the front end of the tip pole piece is allowed to leak out of the medium-opposed surface so as to form a magnetic field for recordation.

It has been revealed that a reduction in the gap depth of the aforementioned type of the tip pole piece leads to reduction in the magnetic field for recordation. In particular, the tip pole piece made of a thinner layer tends to suffer from a remarkable reduction in the magnetic field for recordation if the gap depth is reduced in the aforementioned manner. On the other hand, if the tip pole piece gets thinner, it is possible to form or shape the tip pole piece at a higher dimensional accuracy. Specifically, the core width of the tip pole piece can be reduced in a relatively facilitated manner.

SUMMARY OF THE INVENTION

It is accordingly an object of the present invention to provide a thin film magnetic head capable of establishing a larger magnetic field for recordation even when the upper surface of the upper magnetic pole is subjected to a flattening treatment.

According to a first aspect of the present invention, there is provided a thin film magnetic head comprising: a lower magnetic pole extending rearward from a front end exposed at a medium-opposed surface and defining a flat upper surface; a non-magnetic auxiliary layer designed to swell from the flat upper surface of the lower magnetic pole at a position retracted from the medium-opposed surface; a non-magnetic gap layer extending over the flat upper surface of the lower magnetic pole by a constant thickness at least in a range between the medium-opposed surface and the non-magnetic auxiliary layer; and an upper magnetic pole extending over the non-magnetic gap layer by a predetermined thickness at least in a range defined as a gap depth, said upper magnetic pole defining a thinner film portion of a reduced thickness smaller than the predetermined thickness on the non-magnetic auxiliary layer, wherein a neck height of the upper magnetic pole is set smaller than the gap depth.

The core width of the upper magnetic pole starts getting larger or wider in the lateral direction at the position determined by the neck height. The neck height smaller than the gap depth serves to establish a reduction in the thickness of the upper magnetic pole in a range rearward of the position determined by the neck height. The upper magnetic pole is allowed to suffer from less magnetic saturation at the thinner film portion as compared with the case where the neck height is set larger than the gap depth. A sufficient quantity of a magnetic flux can be introduced into the front end of the upper magnetic pole through the thinner film portion. It is possible to reliably enhance a magnetic field leaked out of the medium-opposed surface, namely, a magnetic field for recordation, in the thin film magnetic head.

In general, when a flat upper surface is defined on the upper magnetic pole, the aforementioned non-magnetic auxiliary layer inevitably generates the thinner film portion in the upper magnetic pole. Magnetic saturation tends to occur at the thinner film portion in the upper magnetic pole. If the neck height is set smaller or shorter than the gap depth in the aforementioned manner, magnetic saturation can be suppressed at the thinner film portion to the utmost.

In this case, it is preferable to set the difference between the gap depth and the neck height in a range within 1.0 $\mu$m. If the difference between the gap depth and the neck height exceeds 1.0 $\mu$m, a magnetic flux tends to disperse in the upper magnetic pole over a region defined by the gap depth. It thus becomes difficult to reliably enhance a magnetic field leaked out of the medium-opposed surface, namely, a magnetic field for recordation, in the thin film magnetic head.

According to a second aspect of the present invention, there is provided a thin film magnetic head comprising: a lower magnetic pole layer extending rearward from a front end exposed at a medium-opposed surface and defining a flat upper surface; a non-magnetic auxiliary layer designed to swell from the flat upper surface of the lower magnetic pole layer at a position retracted from the medium-opposed surface; a non-magnetic gap layer extending over the flat upper surface of the lower magnetic pole layer by a constant thickness at least in a range between the medium-opposed surface and the non-magnetic auxiliary layer; an upper magnetic tip pole piece extending over the non-magnetic gap layer by a predetermined thickness at least in a range defined as a gap depth, said upper magnetic tip pole piece defining a thinner film portion of a reduced thickness smaller than the predetermined thickness on the non-magnetic auxiliary layer; and an upper magnetic pole layer extending from a central position of a coil pattern and received on the upper magnetic tip pole piece at a tip end, wherein a neck height of the upper magnetic tip pole piece is set smaller than the gap depth.

The upper magnetic tip pole piece can be formed on a flat surface in the thin film magnetic head prior to formation of a conductive swirly coil pattern. The core width of the upper magnetic tip pole piece can sufficiently be reduced so as to define a narrower recording track over a magnetic recording medium. In addition, since the neck height is set smaller or shorter than the gap depth, the upper magnetic tip pole piece is allowed to suffer from less magnetic saturation at the thinner film portion as compared with the case where the neck height is set larger than the gap depth. A sufficient quantity of a magnetic flux can be introduced into the front end of the upper magnetic tip pole piece through the thinner film portion. It is possible to reliably enhance a magnetic field leaked out of the medium-opposed surface, namely, a magnetic field for recordation, in the thin film magnetic head.

A flat upper surface may be defined on the upper magnetic tip pole piece in the aforementioned manner. In this case, the difference between the gap depth and the neck height should be set smaller than 1.0 μm, as described above.

The upper magnetic pole layer may be terminated at a position retracted from the medium-opposed surface by a distance larger than the neck height in the thin film magnetic head. Even if the upper magnetic pole layer is terminated before it reaches the medium-opposed surface in this manner, a magnetic saturation can be suppressed at the thinner film portion of the upper magnetic tip pole piece, as described above. Moreover, the distance may be set smaller than the gap depth. When the upper magnetic pole layer is allowed to reach a position forward of the rear end of a region determined by the gap depth in this manner, the upper magnetic tip pole piece can receive a larger quantity of a magnetic flux from the upper magnetic pole layer.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
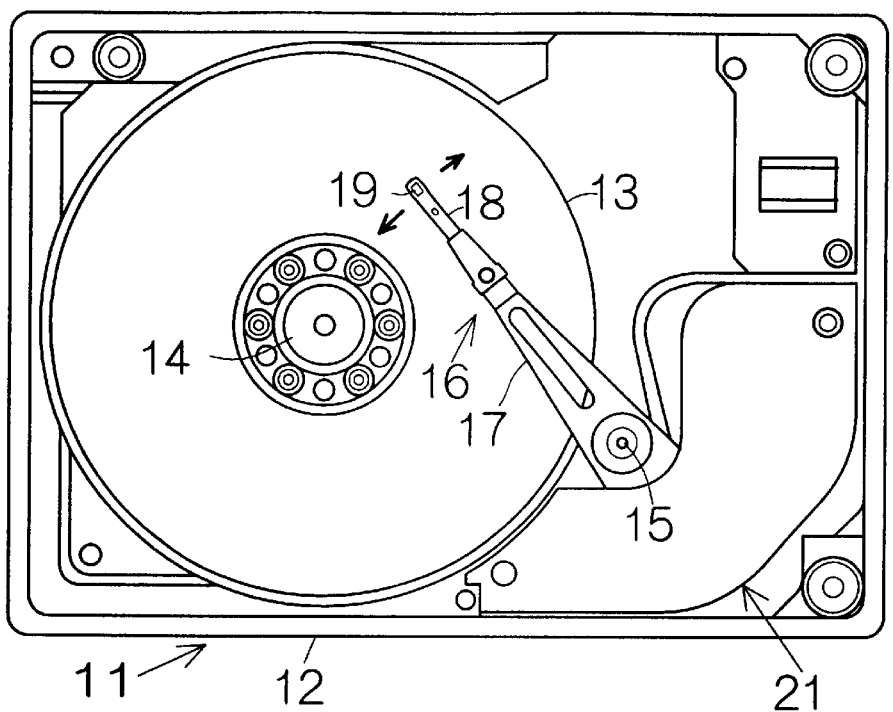
FIG. 1 is a plan view schematically illustrating the structure of a hard disk drive (HDD)

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A carriage 16 is also accommodated in the inner space of the primary enclosure 12 for swinging movement about a vertical support shaft 15. The carriage 16 includes a rigid swinging arm 17 extending in the horizontal direction from the vertical support shaft 15, and an elastic head suspension 18 fixed to the tip end of the swinging arm 17 so as to extend forward from the swinging arm 17. As conventionally known, a flying head slider 19 is cantilevered at the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive airflow generated along the rotating magnetic recording disk 13. The airflow serves to generate a lift on the flying head slider 19. The flying head slider 19 is thus allowed to keep flying above the surface of the magnetic recording disk 13 during rotation of the magnetic recording disk 13 at a higher stability established by the balance between the lift and the urging force of the head suspension 18.

When the carriage 16 is driven to swing about the support shaft 15 during flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an electromagnetic actuator 21 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspensions 18 are mounted on a single common swinging arm 17 between the adjacent magnetic recording disks 13.

Figure 2:
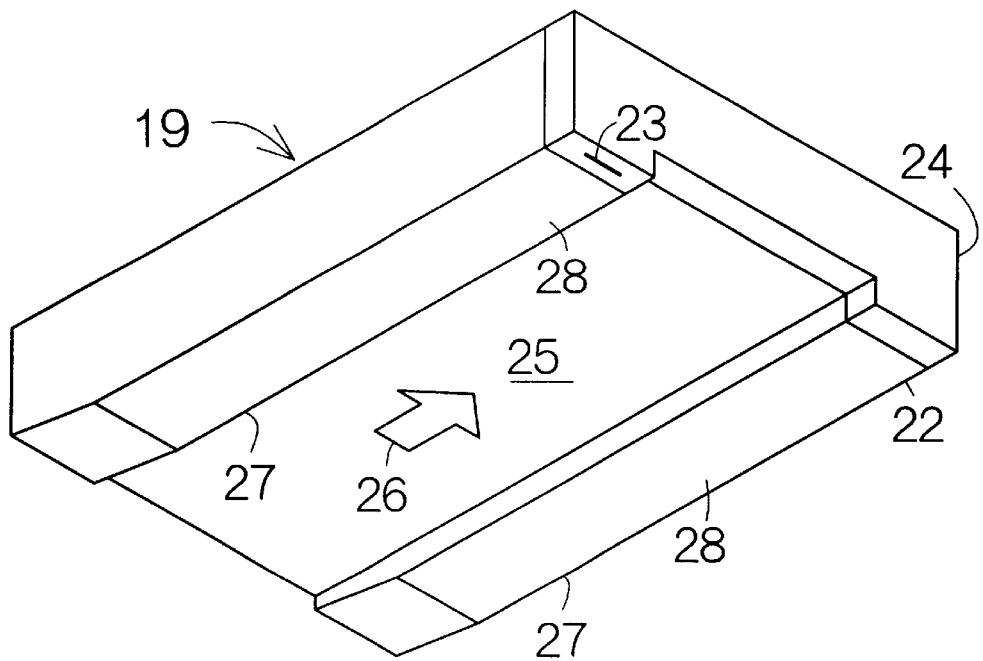
FIG. 2 is an enlarged perspective view of a flying head slider according to a specific example.

FIG. 2 illustrates a specific example of the flying head slider 19. The flying head slider 19 of this type includes a slider body 22 made from $Al_2O_3$—TiC in the form of a flat parallelepiped, and a head containing layer 24 coupled to the trailing or downstream end of the slider body 22. The head containing layer 24 may be made of $Al_2O_3$. A read/write electromagnetic transducer 23 is embedded in the head containing layer 24. A medium-opposed surface or bottom surface 25 is defined continuously over the slider body 22 and the head containing layer 24 so as to face the surface of the magnetic recording disk 13 at a distance. The bottom surface 25 is designed to receive airflow 26 generated along the surface of the rotating magnetic recording disk 13.

A pair of rails 27 are formed to extend over the bottom surface 25 from the leading or upstream end toward the trailing end. The individual rail 27 is designed to define an air bearing surface 28 at its top surface. In particular, the airflow 26 generates the aforementioned lift at the respective air bearing surfaces 28. The read/write electromagnetic transducer 23 embedded in the head containing layer 24 is exposed at the air bearing surface 28 as described later in detail. The flying head slider 19 may take any shape or form other than the above-described one.

Figure 3:
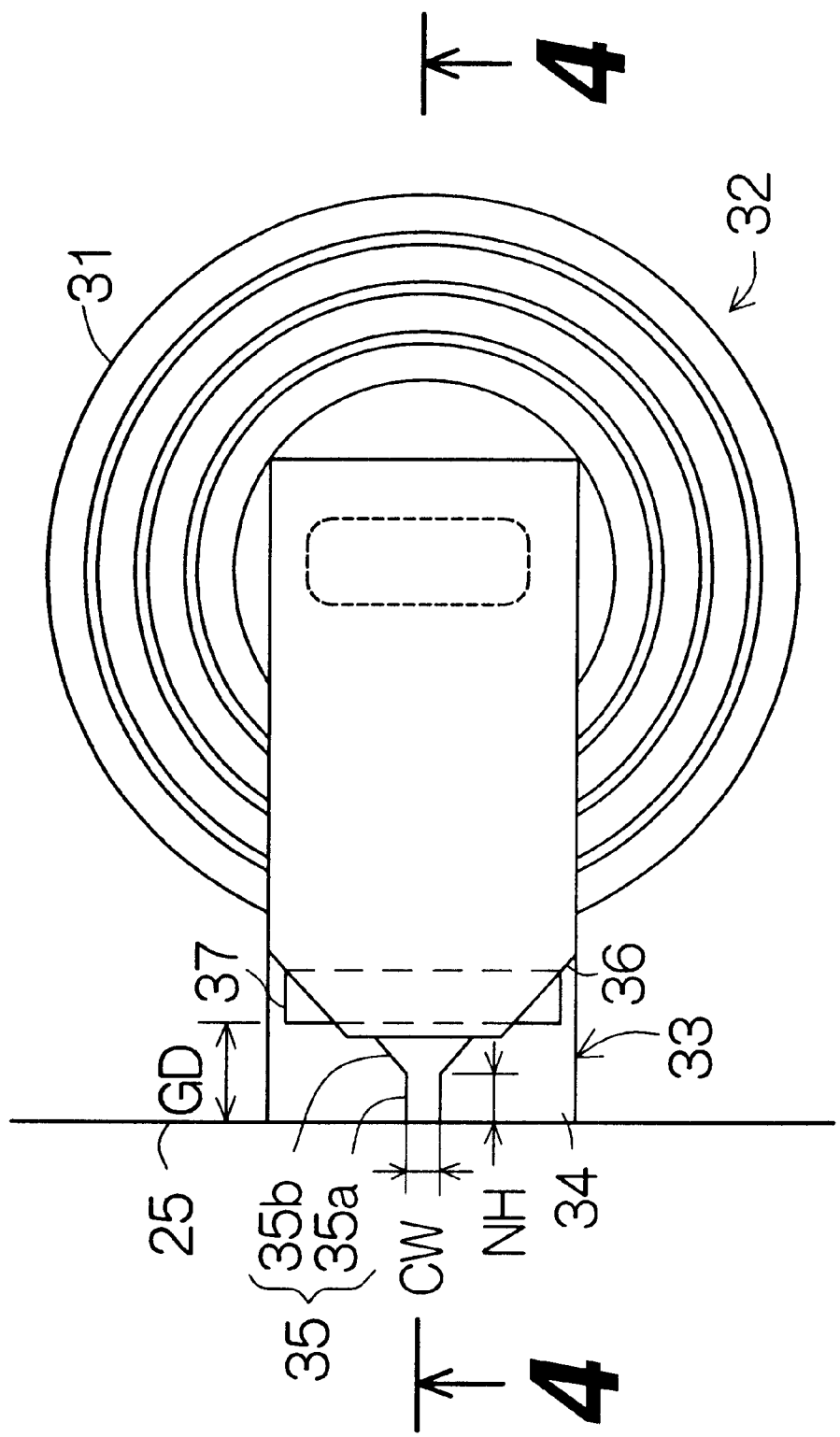
FIG. 3 is an enlarged plan view schematically illustrating the structure of a magnetic core in a thin film magnetic head according to the present invention.

As shown in FIG. 3 in detail, the read/write electromagnetic transducer 23 includes an inductive write element or a thin film magnetic head 32 according to an embodiment of the present invention. The thin film magnetic head 32 is designed to utilize a magnetic field induced at a conductive swirly coil pattern 31 so as to record magnetic binary data into the magnetic recording disk 13. When a magnetic field is induced at the swirly coil pattern 31 in response to an electric current supply, a magnetic flux is allowed to circulate through a magnetic core 33 penetrating through the swirly coil pattern 31 at its central position. The swirly coil pattern 31 may be made from a conductive metallic material such as Cu, for example.

Figure 4:
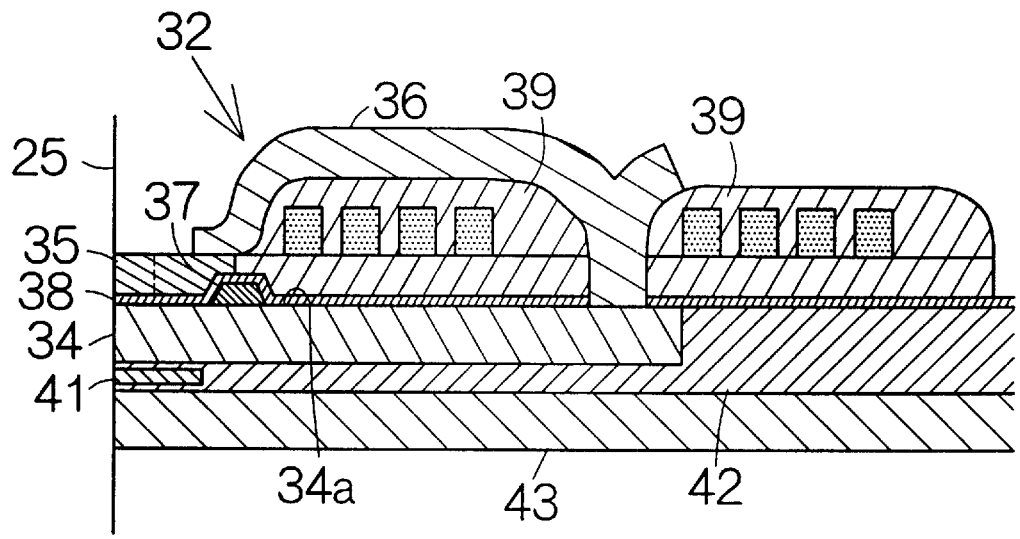
FIG. 4 is a sectional view taken along the line 4—4 in FIG. 4.

Referring also to FIG. 4, the magnetic core 33 includes a lower magnetic pole layer 34 extending rearward over a plane from the front end exposed at the bottom surface 25. A flat upper surface 34a is defined on the lower magnetic pole layer 34. The rear end of the lower magnetic pole layer 34 is allowed to reach at least the central position of the swirly coil pattern 31. The lower magnetic pole layer 34 may be made from NiFe, for example.

An upper magnetic tip pole layer 35 is opposed to the flat upper surface 34a of the lower magnetic pole layer 34. The upper magnetic tip pole layer 35 is allowed to expose its front end at the bottom surface 25. As is apparent from FIG. 3, the upper magnetic tip pole layer 35 includes a tip pole piece 35a of a constant core width CW extending in the longitudinal direction, and a primary pole layer 35b connected to the rear end of the tip pole piece 35a. The primary pole layer 35b is allowed to gradually increase its core width in the rearward direction. The tip pole piece 35a and the primary pole layer 35b are formed integral to each other, as described later in detail. The neck height NH of the upper magnetic tip pole layer 35 can be defined as the distance between the bottom surface 25 and the position where the core width of the upper magnetic tip pole layer 35 starts getting wider in the lateral direction. Specifically, the length of the tip pole piece 35a corresponds to the neck height NH. The upper magnetic tip pole layer 35 may be made from NiFe, for example.

An upper magnetic pole layer 36 is designed to extend forward from the central position of the swirly coil pattern 31 toward the bottom surface 25. The upper magnetic pole layer 36 is received on the upper magnetic tip pole layer 35 at the front end. The front end of the upper magnetic pole layer 36 is terminated at a position retracted from the bottom surface 25 before it reaches the bottom surface 25. The upper magnetic pole layer 36 may be made from NiFe, for example.

A stripe of a non-magnetic auxiliary layer 37 is formed to extend in the lateral direction, defining the direction of the core width, on the flat upper surface 34a of the lower magnetic pole layer 34 at a position retracted from the bottom surface 25. The non-magnetic auxiliary layer 37 is designed to define the front end extending in parallel with the bottom surface 25. The front end of the non-magnetic auxiliary layer 37 is spaced from the bottom surface 25 by a distance referred to as a gap depth GD. As is apparent from FIG. 4, the non-magnetic auxiliary layer 37 is allowed to swell from the flat upper surface 34a of the lower magnetic pole layer 34. The non-magnetic auxiliary layer 37 may be made from $SiO_2$, for example.

As shown in FIG. 4, a non-magnetic gap layer 38 is formed to extend over the flat upper surface 34a of the lower magnetic pole layer 34. The non-magnetic gap layer 38 covers over the non-magnetic auxiliary layer 37 on the flat upper surface 34a of the lower magnetic pole layer 34. The non-magnetic gap layer 38 is interposed between the lower magnetic pole layer 34 and the upper magnetic tip pole layer 35 at the front end of the magnetic core 33 exposed at the bottom surface 25. Here, the non-magnetic gap layer 38 is allowed to maintain a constant thickness not only in a region between the bottom surface 25 and the non-magnetic auxiliary layer 37 but also in a region over the surface of the non-magnetic auxiliary layer 37 as well as in a region rearward of the non-magnetic auxiliary layer 37.

The aforementioned swirly coil pattern 31 is embedded within an insulation layer 39 swelling from the surface of the non-magnetic gap layer 38. The insulation layer 39 is interposed between the lower and upper magnetic pole layers 34, 36. The upper magnetic pole layer 36 is magnetically connected to the lower magnetic pole layer 34 at the central position of the swirly coil pattern 31.

The thin film magnetic head 32 is disposed on an $Al_2O_3$ (alumina) layer 42 containing a magnetoresistive (MR) element 41 for reading magnetic information data. The alumina layer 42 is interposed between the lower magnetic pole layer 34 of the thin film magnetic head 32 and a lower shield layer 43 made from FeN or NiFe. Specifically, the lower magnetic pole layer 34 is allowed to function as an upper shield layer for the magnetoresistive element 41. The lower magnetic pole layer 34 is accordingly required to extend over a broader area in the lateral direction at the front end of the thin film magnetic head 32, as compared with the upper magnetic tip pole layer 35 or tip pole piece 35a, so as to achieve a reliable shielding function, as shown in FIG. 3, for example. The magnetoresistive element 41 may be represented by a giant magnetoresistive (GMR) element, a tunnel-junction magnetoresistive (TMR) element, or the like. Alternatively, the thin film magnetic head 32 may solely be employed without the magnetoresistive element 41.

Figure 5:
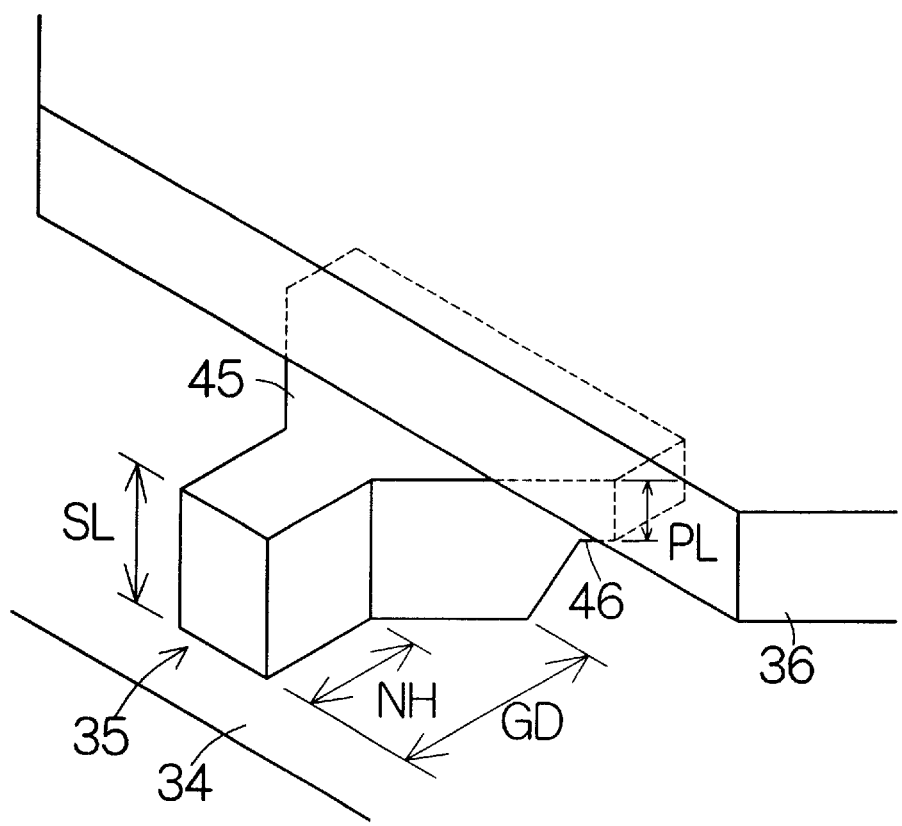
FIG. 5 is en enlarged perspective view of an upper magnetic tip pole layer.

Next, a detailed description will be made on the shape of the aforementioned upper magnetic tip pole layer 35. As shown in FIG. 5, a flat upper surface 45 is defined on the upper magnetic tip pole layer 35. The flat upper surface 45 of the upper magnetic tip pole layer 35 is allowed to extend in parallel with the flat upper surface 34a of the lower magnetic pole layer 34, for example. The upper magnetic tip pole layer 35 keeps a constant first thickness SL between the flat upper surface 45 and the non-magnetic gap layer 38 in an area determined by the gap depth GD between the bottom surface 25 and the non-magnetic auxiliary layer 37. On the other hand, a thinner film portion 46 can be defined in the upper magnetic tip pole layer 35 in an area over the non-magnetic auxiliary layer 37 between the non-magnetic auxiliary layer 37 and the flat upper surface 45. The thinner film portion 46 has a reduced second thickness PL smaller than the first thickness SL.

As is apparent from FIG. 5, the neck height NH is set shorter than the gap depth GD in the upper magnetic tip pole layer 35. Referring also to FIG. 3, the front end of the upper magnetic pole layer 36 is allowed to reach the position forward of the rear end of the gap depth GD and rearward of the rear end of the neck height NH. Specifically, the front end of the upper magnetic pole layer 36 is spaced from the bottom surface 25 by a distance smaller than the gap depth GD and larger than the neck height NH.

When an electric current is supplied to the swirly coil pattern 31 in the thin film magnetic head 32, a magnetic field is induced in the swirly coil pattern 31 at the central position thereof. A magnetic flux is thus allowed to circulate through the upper and lower magnetic pole layers 36, 34. The magnetic flux flowing through the upper magnetic pole layer 36 is directed to the upper magnetic tip pole layer 35. The non-magnetic gap layer 38 serves to leak the magnetic flux from the upper magnetic tip pole layer 35, namely, the tip pole piece 35a, out of the bottom surface 25. The leaked magnetic flux forms the magnetic field for recordation at the bottom surface 25. The magnetic field magnetizes the magnetic recording disk 13 opposed to the bottom surface 25 at a distance. A recording track of the width corresponding to the core width CW of the tip pole piece 35a can be defined over the surface of the magnetic recording disk 13. The tip pole piece 35a of a smaller size contributes to establishment of a narrower recording track. In particular, since the upper magnetic pole layer 36 is terminated at a position retracted from the bottom surface 25 in the aforementioned thin film magnetic head 32, it is possible to reliably prevent an undesirable magnetic field from leaking out of the bottom surface 25 from the front end of the upper magnetic pole layer 36. A larger undesirable magnetic field may lead to recordation of a reversed binary data, erroneous erasure of a recorded data, and the like.

Figure 6A:
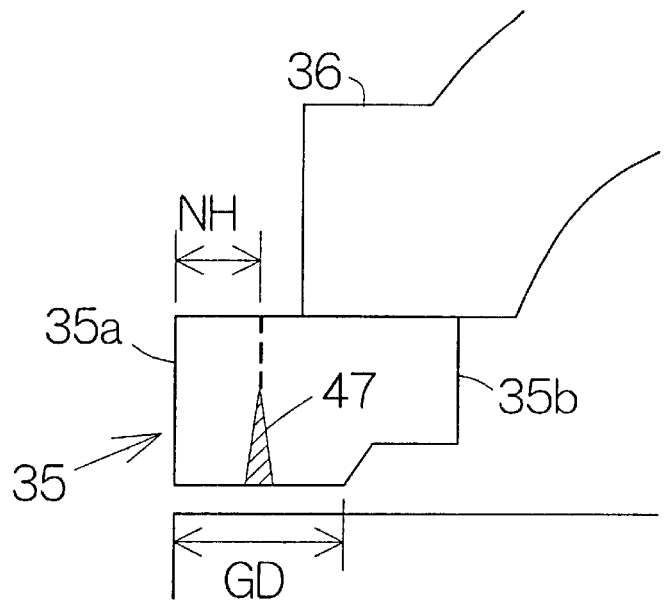
FIG. 6A is a partial sectional view of the upper magnetic tip pole layer according to the present embodiment, for schematically illustrating the position of the magnetic saturation in the case where the upper magnetic tip pole layer has a relatively larger thickness.
Figure 6B:
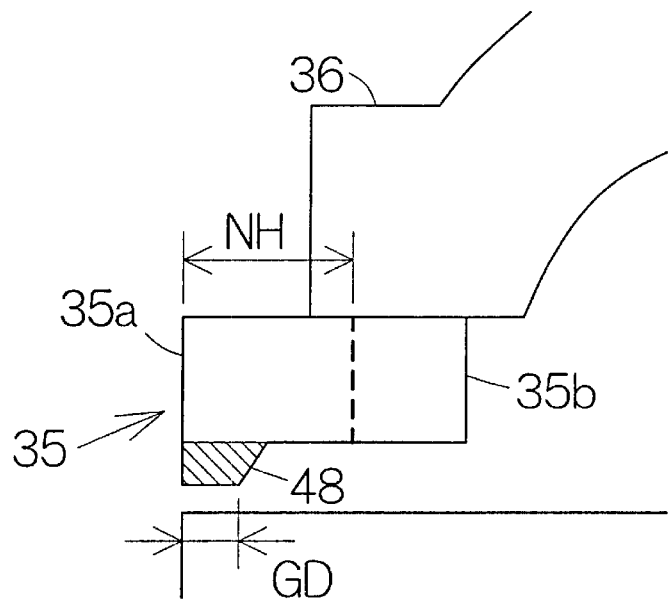
FIG. 6B is a partial sectional view of the upper magnetic tip pole layer in a conventional thin film magnetic head, for schematically illustrating the position of the magnetic saturation in the case where the upper magnetic tip pole layer has a relatively larger thickness.

Now, assume that the upper magnetic tip pole layer 35 is allowed to have a sufficient thickness SL, PL, in particular, a sufficient second thickness PL, as shown in FIG. 6A, for example. In this case, a magnetic saturation 47 is induced at the interface or boundary between the primary pole layer 35b and the tip pole piece 35a since the neck height NH is set smaller or shorter than the gap depth GD. A superior gradient of the magnetic intensity can be established in the upper magnetic tip pole layer 35. A relatively larger magnetic field for recordation can thus be obtained at the tip pole piece 35a. On the other hand, when the neck height NH is set larger than the gap depth GD, as shown in FIG. 6B, for example, a magnetic saturation 48 is induced in the upper magnetic tip pole layer 35 at the front area determined by the gap depth GD. The gradient of the magnetic intensity tends to deteriorate, so that only a smaller magnetic field for recordation can be obtained.

Figure 7A:
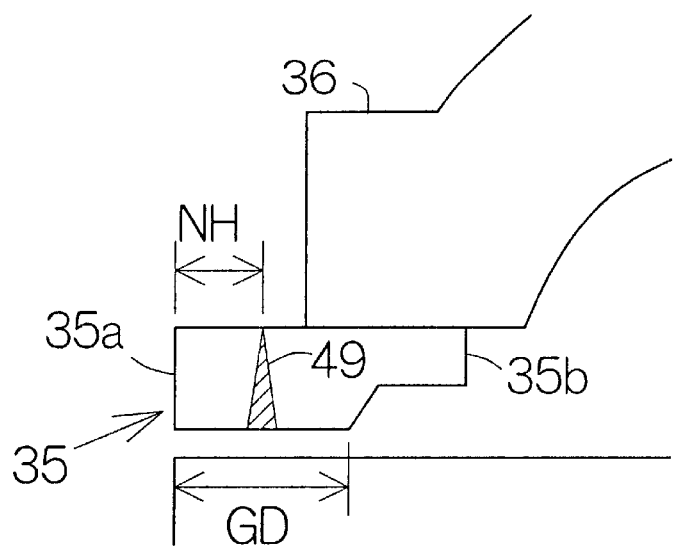
FIG. 7A is a partial sectional view of the upper magnetic tip pole layer according to the present embodiment, for schematically illustrating the position of the magnetic saturation in the case where the upper magnetic tip pole layer has a reduced thickness.
Figure 7B:
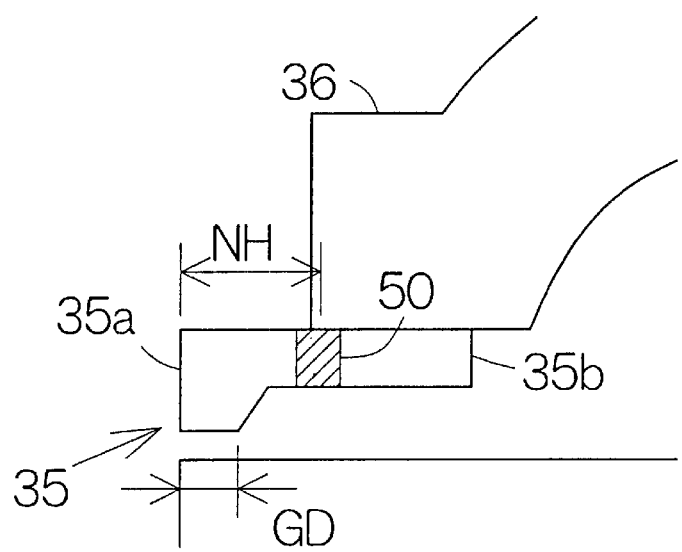
FIG. 7B is a partial sectional view of the upper magnetic tip pole layer in a conventional thin film magnetic head, for schematically illustrating the position of the magnetic saturation in the case where the upper magnetic tip pole layer has a reduced thickness.

Next, assume that the thickness SL, PL, in particular, the second thickness PL is reduced in the upper magnetic tip pole layer 35, as shown in FIG. 7A, for example. Even in this case, the neck height NH smaller than the gap depth GD likewise serves to establish a magnetic saturation 49 at the interface or boundary between the primary pole layer 35b and the tip pole piece 35a. The first thickness SL can reliably be established at the interface between the primary pole layer 35b and the tip pole piece 35a. A cross-section of a sufficient area can be defined at the interface, so that a sufficient quantity of the magnetic flux can be introduced into the tip pole piece 35a. On the other hand, when the neck height NH is set larger than the gap depth CD, as shown in FIG. 7B, for example, the upper magnetic tip pole layer 35 is only allowed to have the second thickness PL, smaller than the first thickness SL, at the interface between the primary pole layer 35b and the tip pole piece 35a. The interface is only allowed to have a cross-section of a smaller area. This tends to promote the magnetic saturation 50 in the upper magnetic tip pole layer 35, so that only a smaller quantity of the magnetic flux can be introduced into the tip pole piece 35a.

In addition, when the neck height NH is set smaller than the gap depth GD in the aforementioned manner, the upper magnetic tip pole layer 35 can be opposed to the lower magnetic pole layer 34 over a broader area, as compared with the case where the tip pole piece 35a is simply opposed to the lower magnetic pole layer 34. This arrangement serves to reduce the magnetoresistance between the upper magnetic tip pole layer 35 and the lower magnetic pole layer 34. An increased quantity of the magnetic flux can be introduced into the tip pole piece 35a. A magnetic field for recordation can further be enhanced. The thin film magnetic head 32 is allowed to efficiently write magnetic information data into the magnetic recording disk 13. Even when the magnetic permeability $\mu$ is reduced in the magnetic core 33, it is still possible to establish a larger magnetic field for recordation in response to the reduction in the magnetoresistance. A reduction in the magnetic permeability $\mu$ may possibly be induced in response to generation of an eddy current during a high-frequency recordation, for example.

The present inventors have demonstrated the magnetic characteristic of the thin film magnetic head 32. In demonstration, the inventors utilized commercial computer simulation software for analyzing a three-dimensional magnetic field. A magnetomotive force was set at 0.5A for the computer calculation. The intensity of the magnetic field was measured at a plane spaced from the bottom surface 25 by a distance of 35 nm. In measurement, the inventors maintained the constant neck height NH(=1.0 $\mu$m or 1.5 $\mu$m) while the gap depth GD was gradually increased from the level of 0.5 $\mu$m. And also, the magnetic permeability was set at three different levels such as $\mu$=1,000, $\mu$=200 and p=100. The first thickness SL of the upper magnetic tip pole layer 35 was set at 1.5 $\mu$m. The core width CW of the tip pole piece 35a was set at 0.5 $\mu$.m. The front end of the upper magnetic pole layer 36 was set spaced from the bottom surface 25 by 1.5 $\mu$m.

Figure 8:
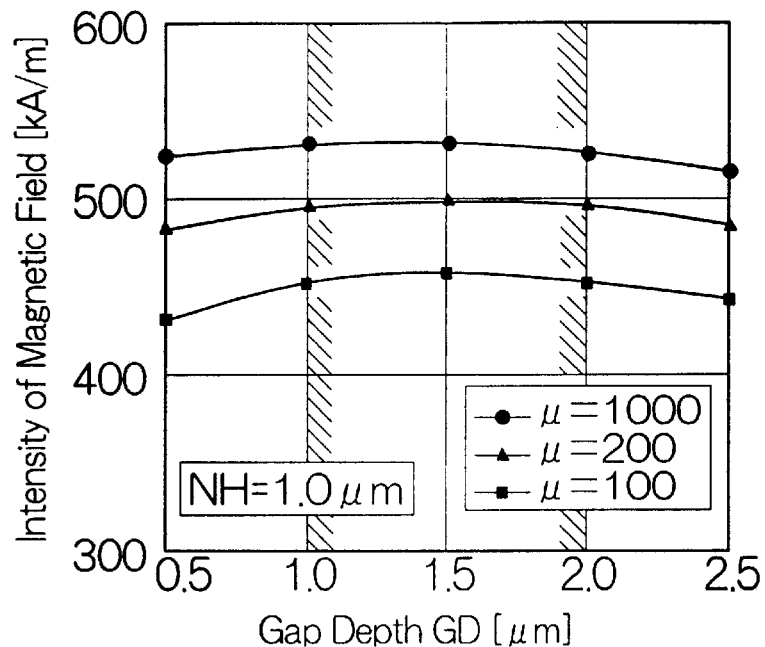
FIG. 8 is a graph illustrating the effect of the relationship between the neck height NH(=1.0 μm) and the gap depth GD on the magnetic field of the thin film magnetic head.
Figure 9:
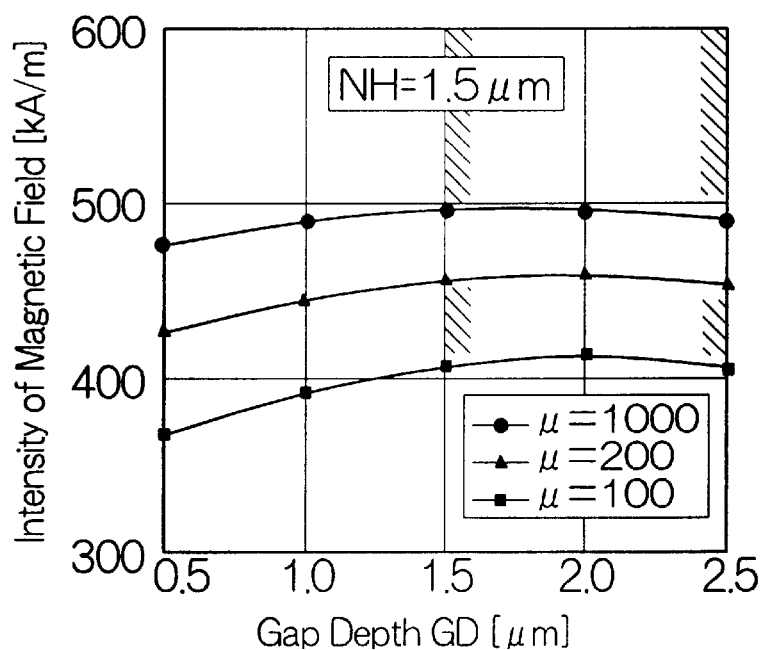
FIG. 9 is a graph illustrating the effect of the relationship between the neck height NH(=1.5 μm) and the gap depth GD on the magnetic field of the thin film magnetic head.

As shown in FIGS. 8 and 9, a magnetic field can be increased in response to an increase in the gap depth GD irrespective of the level of the magnetic permeability $\mu$. In particular, when the gap depth GD is set larger than the neck height NH, the magnetic field exhibits the maximum intensity. It should be noted that the difference between the gap depth GD and the neck height NH exceeds 1.0 $\mu$m, the magnetic field gets smaller. It is thus preferable to set the difference between the gap depth GD and the neck height NH in a range within 1.0 $\mu$m in the thin film magnetic head 32.

Figure 10:
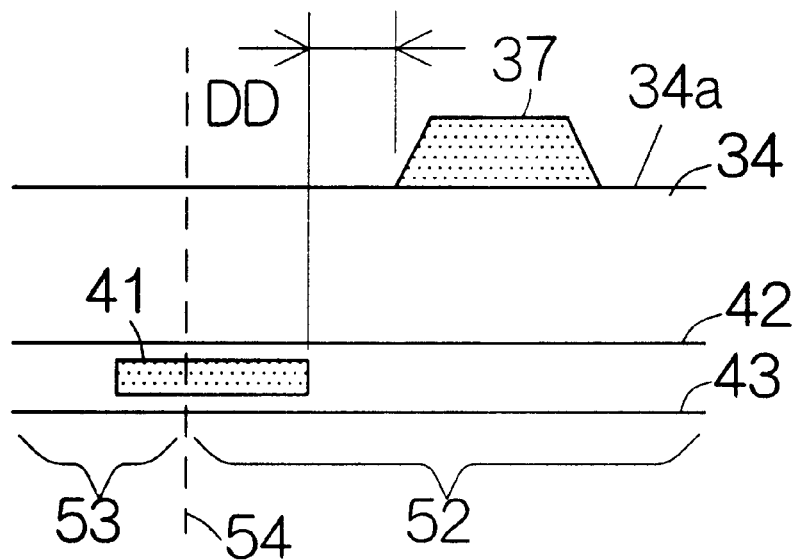
FIG. 10 is a partial sectional view illustrating the process of making the thin film magnetic head.

Next, a brief description will be made on a method of making the thin film magnetic head 32. The lower shield layer 43, the magnetoresistive element 41 and the alumina layer 42 containing the magnetoresistive element 41 on the lower shield layer 43 is first formed in a conventional manner on the surface of a wafer comprising an $Al_2O_3$—TiC substrate and an $Al_2O_3$ (alumina) lamination covering over the $Al_2O_3$—TiC substrate. As shown in FIG. 10, a primary section 52 and a marginal section 53 are defined in the wafer. The primary section 52 will finally be cut out into the slider body 22. The marginal section 53 will be subjected to abrasion during formation of the bottom surface 25 of the cut out slider body 22. The interface or boundary 54 between the primary and marginal sections 52, 53 may be displaced depending on the quantity of the abrasion, as described later in detail.

As conventionally known, the lower magnetic pole layer 34 is then formed on the alumina layer 42 so as to extend over the primary and marginal sections 52, 53. The stripe of the non-magnetic auxiliary layer 37 is then formed on the flat upper surface 34a of the lower magnetic pole layer 34. The non-magnetic auxiliary layer 37 can be positioned at a higher accuracy based on the position of the magnetoresistive element 41. A predetermined distance DD can be set between the rear end of the magnetoresistive element 41 and the front end of the non-magnetic auxiliary layer 37 so as to position the non-magnetic auxiliary layer 37 at a higher accuracy. The non-magnetic auxiliary layer 37 can be shaped out of an insulation layer such as $SiO_2$ layer spreading over the surface of the wafer. An ion milling process can be employed to form the non-magnetic auxiliary layer 37, for example. In this case, a photoresist film may be formed to extend over the insulation layer so as to pattern the non-magnetic auxiliary layer 37 in a conventional manner.

Figure 11:
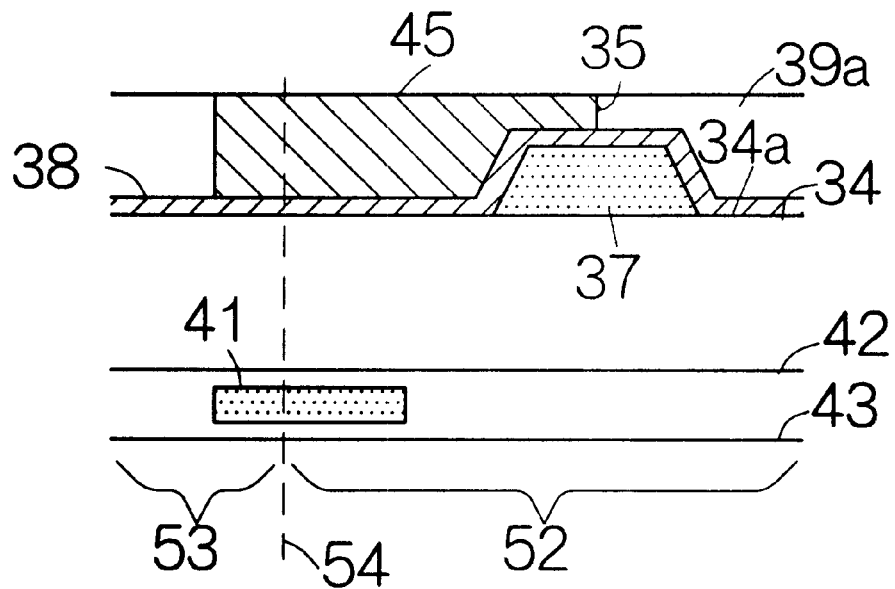
FIG. 11 is a partial sectional view illustrating the process of making the thin film magnetic head.

The non-magnetic gap layer 38 is thereafter uniformly formed to cover over the surface of the wafer, as conventionally known. As shown in FIG. 11, for example, the upper magnetic tip pole layer 35 is formed to extend over the surface of the non-magnetic gap layer 38. An electrodeposition such as an electroplating or the like may be employed to form the upper magnetic tip pole layer 35, for example. A photoresist film may be formed on the surface of the non-magnetic gap layer 38 so as to pattern a void corresponding to the shape of the upper magnetic tip pole layer 35. When the photoresist film is formed, the void utilized to form the upper magnetic tip pole layer 35 can be positioned at a higher accuracy relative to the position of the magnetoresistive element 41. After removal of the photoresist film, a lower insulation layer 39a is formed on the wafer. Thereafter, the surface of the insulation layer 39a is subjected to a flattening polishing process in which the flat upper surface 45 can be defined on the upper magnetic tip pole layer 35.

The swirly coil pattern 31 is then formed on the lower insulation layer 39a after the flattening polishing process. When an upper insulation layer, not shown, is formed to cover over the surface of the lower insulation layer 39a, the swirly coil pattern 31 embedded within the insulation layer 39 can be obtained. Thereafter, the upper magnetic pole layer 36 is formed to extend forward over the surface of the insulation layer 39 from the central position of the swirly coil pattern 31. The front end of the upper magnetic pole layer 36 is received on the flat upper surface 45 of the upper magnetic tip pole layer 35. An electrodeposition such as an electroplating or the like may be employed to form the upper magnetic tip pole layer 35, for example. The upper magnetic tip pole layer 35 is subsequently covered with an alumina overcoat, not shown. In this manner, the thin film magnetic head 32 and the magnetoresistive element 41 are interposed between the alumina overcoat and the alumina lamination previously formed over the surface of the wafer. A combination of the alumina overcoat and lamination establishes the head containing layer 24.

The individual flying head slier 19 is cut out of the wafer. As conventionally known, the marginal section 53 is scraped off from the cut out flying head slider 19 in shaping the bottom surface 25. The amount of the abrasion to cut off the marginal section 53 can finely be adjusted by detecting the resistance of the magnetoresistive element 41. Since the non-magnetic auxiliary layer 37 and the upper magnetic tip pole layer 35 are positioned at a higher accuracy relative to the position of the magnetoresistive element 41 in the aforementioned manner, the upper magnetic tip pole layer 35 is reliably allowed to have the neck height NH of a predetermined dimension and the gap depth GD of a predetermined dimension.

Figure 12:
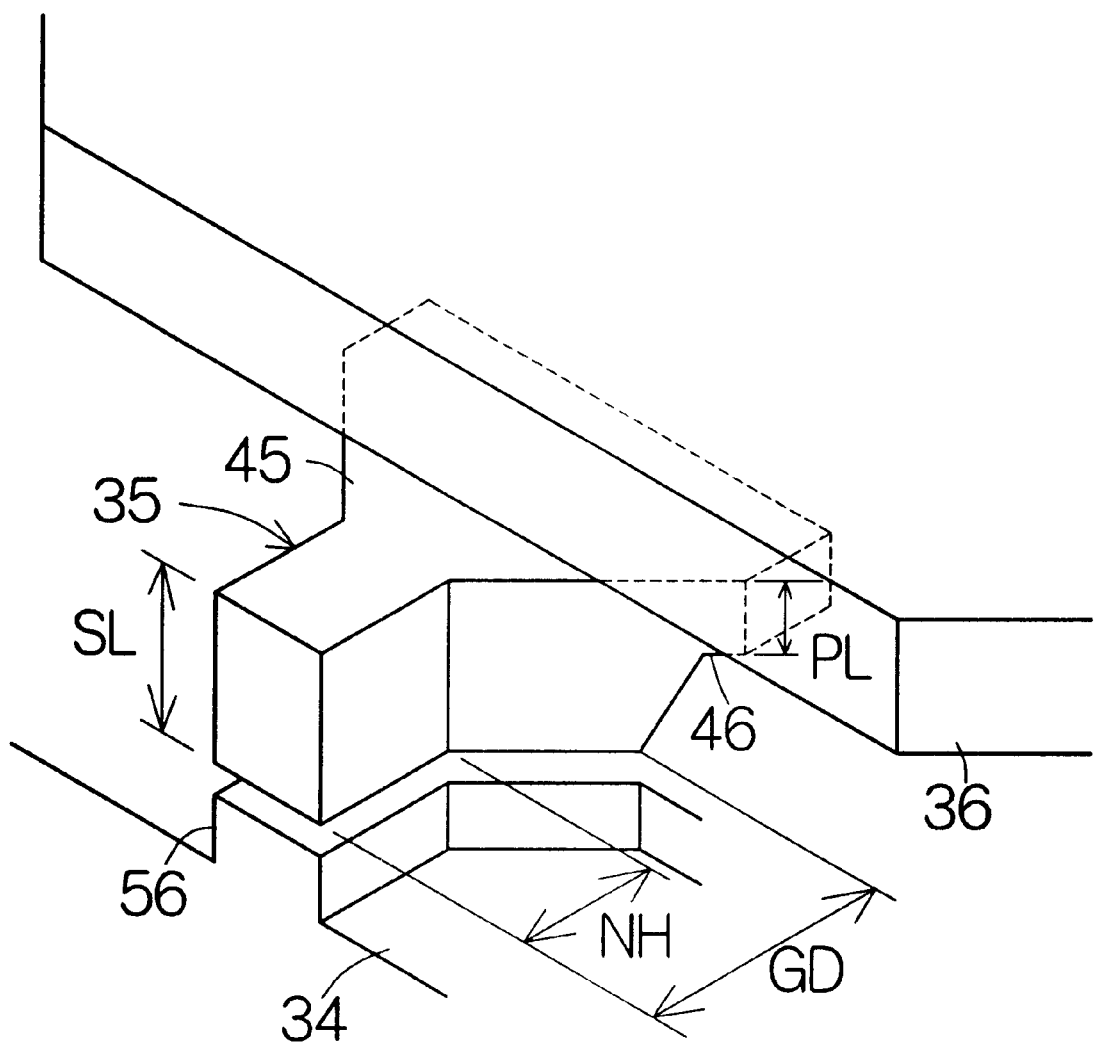
FIG. 12 is an enlarged perspective view, corresponding to FIG. 5, for schematically illustrating a lower tip pole piece added to the lower magnetic pole layer.

As shown in FIG. 12, for example, a lower tip pole piece 56 may be formed to swell from the flat upper surface 34a of the lower magnetic pole layer 34 at a position opposed to the tip pole piece 35a of the upper magnetic tip pole layer 35 in the thin film magnetic head 32.

What is claimed is:

1. A thin film magnetic head comprising:
    a lower magnetic pole extending rearward from a front end exposed at a medium-opposed surface and defining a flat upper surface;
    a non-magnetic auxiliary layer designed to swell from the flat upper surface of the lower magnetic pole at a position retracted from the medium-opposed surface;
    a non-magnetic gap layer extending over the flat upper surface of the lower magnetic pole by a constant thickness in a range between the medium-opposed surface and the non-magnetic auxiliary layer; and
    an upper magnetic pole extending over the non-magnetic gap layer and the non-magnetic auxiliary layer, said upper magnetic pole including a tip portion extending by a constant width rearward from the medium-opposed surface and a rear portion connected to a rear end of the tip portion, said rear portion having a width larger than the constant width, wherein
    a neck height of the upper magnetic pole is set smaller than a gap depth, the gap depth corresponding to a distance between the medium opposed surface and the non-magnetic auxiliary layer, the neck height corresponding to a distance between the medium-opposed surface and the rear end of the tip portion.

2. The thin film magnetic head according to claim 1, wherein a difference between the gap depth and the neck height is set smaller than 1.0 μm.

3. The thin film magnetic head according to claim 1, wherein a flat upper surface is defined on the upper magnetic pole.

4. The thin film magnetic head according to claim 3, wherein a difference between the gap depth and the neck height is set smaller than 1.0 μm.

5. A thin film magnetic head comprising:
    a lower magnetic pole layer extending rearward from a front end exposed at a medium-opposed surface and defining a flat upper surface;
    a non-magnetic auxiliary layer designed to swell from the flat upper surface of the lower magnetic pole layer at a position retracted from the medium-opposed surface;
    a non-magnetic gap layer extending over the flat upper surface of the lower magnetic pole layer by a constant thickness in a range between the medium-opposed surface and the non-magnetic auxiliary layer;

an upper magnetic tip pole piece extending over the non-magnetic gap layer by a predetermined uniform thickness in the range between the medium-opposed surface and the non-magnetic auxiliary layer, said upper magnetic tip pole piece defining a thinner film portion of a reduced thickness smaller than the predetermined uniform thickness on the non-magnetic auxiliary layer, said upper magnetic tip pole piece including a tip pole extending by a constant width rearward from the medium-opposed surface and a primary pole connected to a rear end of the tip pole, said primary pole having a width larger than the constant width; and an upper magnetic pole layer extending from a central position of a coil pattern and received on the upper magnetic tip pole piece at a tip end, wherein
a neck height of the upper magnetic tip pole piece is set smaller than a gap depth, the gap depth corresponding to a distance between the medium-opposed surface and the non-magnetic auxiliary layer, the neck height corresponding to a distance between the medium-opposed surface and the rear end of the tip pole.

6. The thin film magnetic head according to claim 5, wherein a difference between gap depth and the neck height is set smaller than 1.0 μm.

7. The thin film magnetic head according to claim 5, wherein a flat upper surface is defined on the upper magnetic tip pole piece.

8. The thin film magnetic head according to claim 7, wherein a difference between the gap depth and the neck height is set smaller than 1.0 μm.

9. The thin film magnetic head according to claim 5, wherein the tip end of said upper magnetic pole layer is terminated at a position retracted from the medium-opposed surface by a distance larger than the neck height.

10. The thin film magnetic head according to claim 9, wherein said distance is set smaller than the gap depth.

11. The thin film magnetic head according to claim 10, wherein a difference between the gap depth and the neck height is set smaller than 1.0 μm.

12. The thin film magnetic head according to claim 10, wherein a flat upper surface is defined on the upper magnetic tip pole piece.

13. The thin film magnetic head according to claim 12, wherein a difference between the gap depth and the neck height is set smaller than 1.0 μm.

* * * * *